O. E. MALLORY.
Thill-Couplings.
No. 154,879.  Patented Sept. 8, 1874.
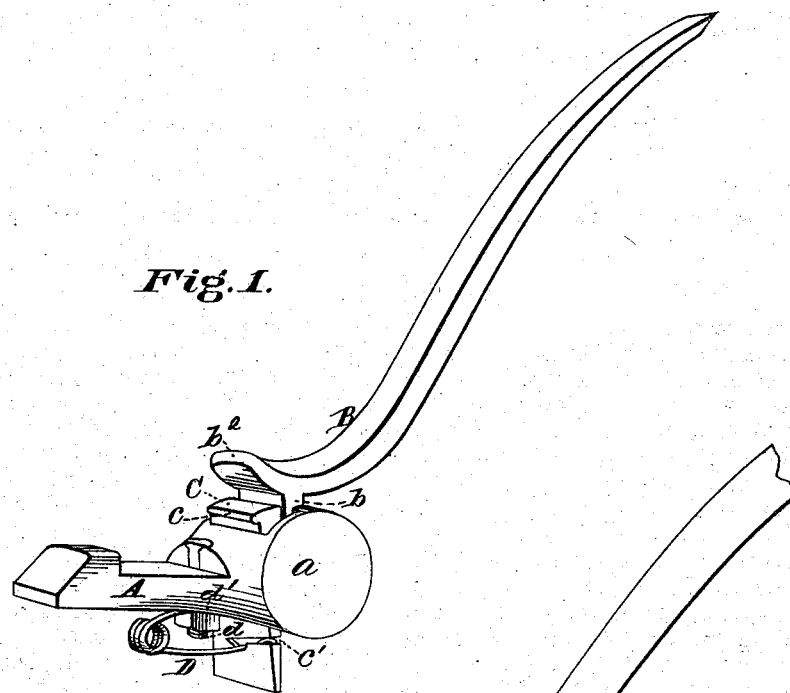
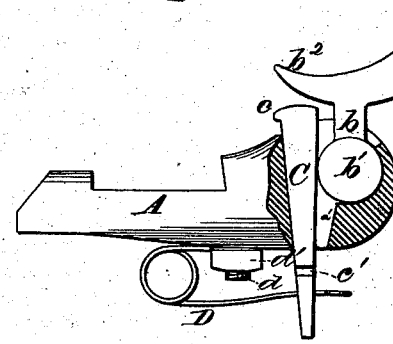
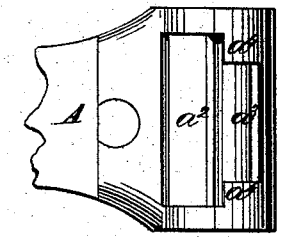
Attest:
C. Clarence Poole,
J. Wm. Mister.
Inventor:
O. E. Mallory,
Edsons Bro.
Attorneys.

UNITED STATES PATENT OFFICE.

ORSON E. MALLORY, OF BATAVIA, NEW YORK, ASSIGNOR OF ONE-HALF HIS RIGHT TO ALVIN COLT, OF SAME PLACE.

IMPROVEMENT IN THILL-COUPLINGS.

Specification forming part of Letters Patent No. 154,879, dated September 8, 1874; application filed August 3, 1874.

*To all whom it may concern:*

Be it known that I, O. E. MALLORY, of Batavia, in the county of Genesee and State of New York, have invented a certain new and useful Improvement in Thill-Couplings, of which the following is a full, clear, and exact description, reference being had to the annexed drawing, in which—

Figure 1 is a perspective and Fig. 2 a side view of my invention, partly in section. Fig. 3 is a plan view of the socket which receives the thill for attaching the latter to the vehicle.

Corresponding parts in the several figures are denoted by like letters.

This invention relates to a certain improvement in thill-couplings; and it consists of the employment, with a socketed plate having an enlarged and contracted opening through which the axis of the thill is inserted to enter the socket of the plate, of a wedge pressed downwardly by a spring depending from the lower side of the said plate, substantially as hereinafter more fully set forth.

In the annexed drawing, A refers to a plate suitably recessed to permit of its adaptation to the front axle of a vehicle, to which it may be attached in any known way, the outer end of which, being formed with an enlargement, $a$, having a socket, $a^1$, which is provided at its upper extremity with an enlarged and contracted opening, $a^2 a^3$. B is the thill, formed with which and depending therefrom is a plate, $b$, having an axis, $b^1$, which is of such a size as to pass through the enlarged portion $a^2$ of the opening above alluded to, and enter the socket $a^1$, its projecting ends fitting in under the projections $a^4 a^4$, formed by the union of the enlarged and contracted portions of the opening $a^2 a^3$, as plainly seen in Fig. 3, to retain the said axis in its socket. The contracted portion of the opening $a^2 a^3$ permits of the upward passage of and freedom of movement to the plate $b$. To further secure the axis $b^1$ of the thill in its socket $a^1$ a wedge or key, C, is inserted in the latter in rear of the said axis, and overhung by the rearwardly-projecting portion $b^2$ of the thill B. A lip or projection, $c$, is formed with the upper or enlarged end of the wedge C, to prevent it, when inserted in the socket $a^1$ and reduced by wear, from sinking or being drawn down into the latter beyond such end. D is a coiled or other spring, one end of which is secured to the lower side of the plate A by a bolt and nut, $d\ d'$, or otherwise, the other or free end of which enters and is retained in a transverse slit or slot, $c'$, in the wedge C, which it presses downwardly, in order to keep it to its place in the socket $a^1$, its tapering end passing through a slot communicating with the said socket, as shown in Fig. 2. This spring also prevents rattling of the wedge.

Having thus described my invention, what I claim, and desire to secure by Letters Patent, is—

The attaching-plate A, with the socket $a\ a^2 a^3$, thill B with the axis $b^1$, key C with the slit $c'$, and spring D, in combination, substantially as and for the purpose set forth.

In testimony whereof I have hereunto signed my name in the presence of two subscribing witnesses this 1st day of August, A. D. 1874.

ORSON E. MALLORY.

Witnesses:
WILLIAM P. DECKER,
A. EDSON TALLMAN.